United States Patent [19]
Gilmore

[11] 3,908,163
[45] Sept. 23, 1975

[54] BANDWIDTH LIMIT CIRCUIT FOR STEP VOLTAGE REGULATOR

[75] Inventor: Thomas P. Gilmore, Wauwatosa, Wis.

[73] Assignee: Allis-Chalmers Corporation, Milwaukee, Wis.

[22] Filed: Nov. 1, 1974

[21] Appl. No.: 520,037

[52] U.S. Cl. ............ 323/43.5 S; 318/624; 318/650; 318/672; 323/45; 330/69
[51] Int. Cl.² .......................................... G05F 1/20
[58] Field of Search............. 323/22 SC, 24, 43.5 S, 323/45; 318/624, 650, 672, 678; 330/69

[56] References Cited
UNITED STATES PATENTS

| | | | |
|---|---|---|---|
| 3,252,078 | 5/1966 | Conner | 323/43.5 S |
| 3,312,891 | 4/1967 | McCabe et al. | 323/45 X |
| 3,585,492 | 6/1971 | McCabe | 323/43.5 S |
| 3,721,894 | 3/1973 | Beckwith | 323/43.5 S |
| 3,725,771 | 4/1973 | Gilmore | 323/43.5 S |

*Primary Examiner*—Gerald Goldberg
*Attorney, Agent, or Firm*—Lee H. Kaiser

[57] ABSTRACT

A bandwidth limit sensing circuit for a step voltage regulator adapted to maintain its output voltage within upper and lower bandwidth limits derives a lower limit reference potential at the wiper of a bandwidth setting potentiometer connected in a circuit across a reference voltage source and an upper limit reference potential at the output of a unity gain operational amplifier inverter having inputs coupled to the potentiometer wiper and to the reference voltage source. First and second voltage comparators respectively compare the upper and lower limit reference potentials to a sample voltage proportional to the regulator output voltage.

10 Claims, 2 Drawing Figures

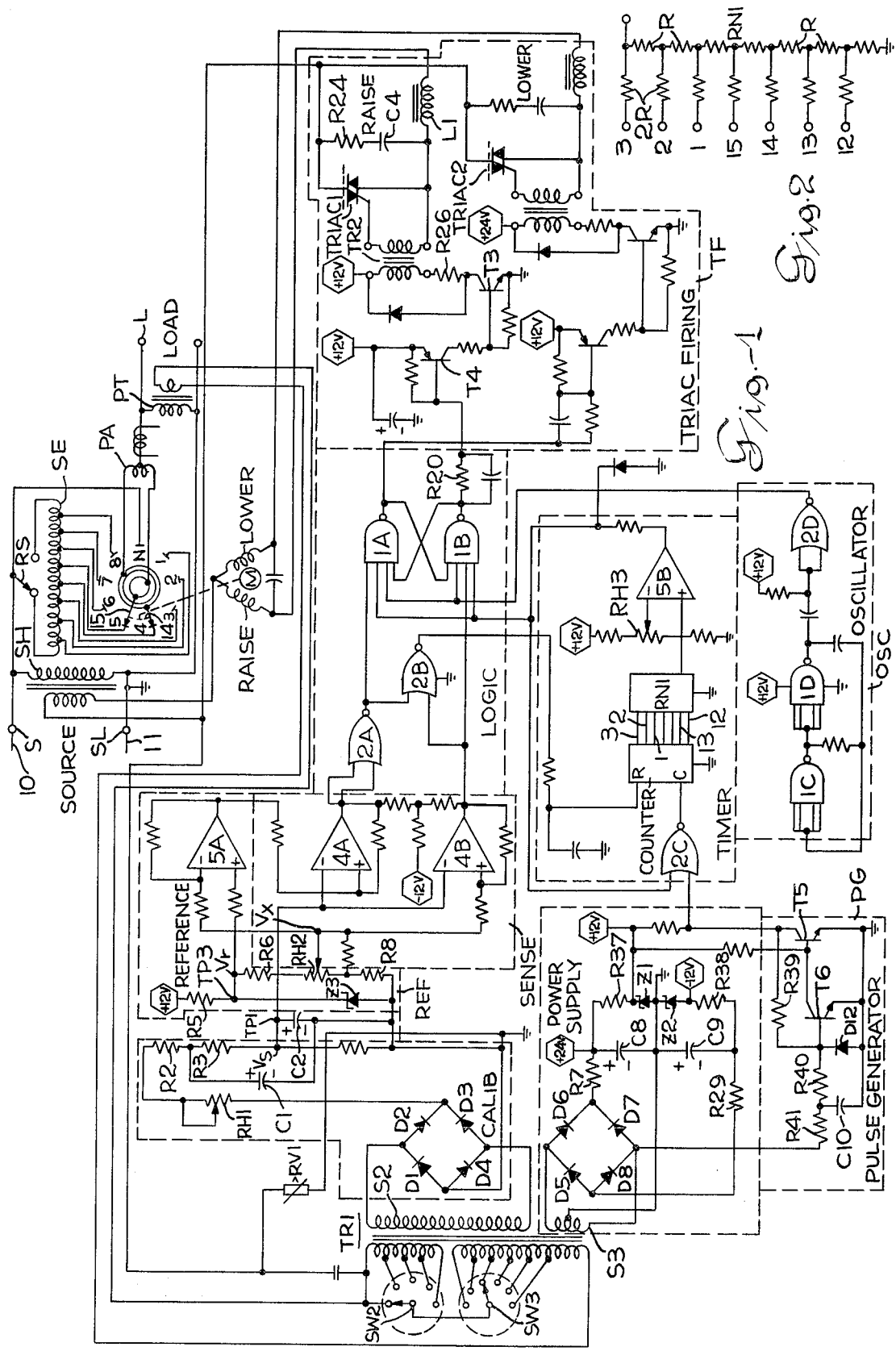

BANDWIDTH LIMIT CIRCUIT FOR STEP VOLTAGE REGULATOR

This invention relates to a control for a step voltage regulator and in particular to a static system for controlling a reversible motor which actuates the movable tap changer contacts of a step voltage regulator to maintain the regulator output voltage within upper and lower bandwidth limits.

BACKGROUND OF THE INVENTION

A step voltage regulator is an autotransformer provided with load ratio control equipment for regulating the voltage on the feeder or bus to which it is connected. The step voltage regulator may have a 100 percent exciting winding in shunt with the line on the source side and normally maintains the voltage on the load side within a desired voltage bandwidth by a 10 percent tapped buck/boost winding in series with the line. The 10 percent series winding has taps connected to stationary contacts of a tap changer switch having a pair of rotatable contacts driven by a reversible motor and usually provides the ability to change the effective turns ratio from input to output plus or minus 10 percent in 32 steps of five-eighths percent voltage.

Static controls for step voltage regulators are known of the type disclosed in my U.S. Pat. No. 3,725,771 having the same assignee as this invention which sense the voltage on the load side and operate "raise" and "lower" relays when the load voltage is beyond the lower and upper bandwidth limits to complete energizing circuits to corresponding windings of the tap changer motor to again bring the voltage within the bandwidth.

OBJECTS OF THE INVENTION

It is an object of the invention to provide an improved bandwidth limit circuit for sensing when the load voltage regulated by a step voltage regulator is beyond the upper and lower bandwidth limits.

Another object is to provide such an improved bandwidth limit sensing circuit for a voltage regulator which is simple to calibrate and permits easy setting of voltage bandwidth.

Still another object is to provide such an improved bandwidth limit circuit that is low in cost but which minimizes periodic maintenance and is characterized by high reliability and thermal stability.

SUMMARY OF THE INVENTION

A step voltage regulator bandwidth limit circuit having sensing means for deriving a D.C. sample voltage which is proportional to the regulator output voltage, a D.C. reference voltage source, a bandwidth setting potentiometer connected in a circuit across the reference voltage source for deriving a lower limit reference potential at the potentiometer wiper which is a preselected fraction of the reference voltage, and a unity gain inverter amplifier receiving the reference voltage and lower limit reference potential as inputs for deriving an upper limit reference potential equal to the sum of the reference potential plus the difference between the reference voltage and the lower limit reference potential. First and second voltage comparators compare the sample voltage to the upper limit reference potential and to the lower limit reference potential respectively and control firing circuits for first and second semiconductor switching means which respectively energize the raise and lower windings of the tap changer motor.

DESCRIPTION OF THE DRAWINGS

These and other objects and advantages of the invention will be more readily apparent from the following detailed description when considered in conjunction with the accompanying drawings wherein:

FIG. 1 is a schematic circuit diagram of a static control for a step voltage regulator embodying the invention; and FIG. 2 is a schematic circuit diagram of the digital-to-analog converter ladder network of the timer of the control shown in FIG. 1.

DETAILED DESCRIPTION

Referring to the drawings, a known step voltage regulator has an exciting winding SH connected across its S and SL terminals which are adapted to be connected to the conductors 10 and 11 of an alternating current power line to be regulated and a series winding SE connected in series with the line and provided with taps connected to the stationary contacts 1-8 of a tap changer switch which are arranged in a circle. One side of exciting winding SH is connected to the respective ends of series winding SE by an automatic, mechanically operated reversing switch RS which reverses the polarity of series winding SE and thereby doubles the range of the tap changer. Two rotatable controls 14 and 15 of the tap changer sequentially engage the stationary contacts 1-8 and N are connected through slip rings to the opposite ends of a midtapped preventive autotransformer PA whose midtap is connected to the regulator terminal L which is adapted to be connected to the load. The rotatable contacts 14 and 15 are actuated by a reversible motor M in a first direction to raise the output voltage when the RAISE winding of the motor is energized and in the opposite direction to lower the output voltage of the step regulator when the LOWER winding of the motor is energized. The step voltage regulator may include a potential transformer PT whose primary winding is connected between the midtap of the preventive autotransformer PA and the SL terminal so that it senses the voltage at the load side. The secondary winding of potential transformer PT supplies a measure of the step regulator output, or load voltage to the primary of a potential sensing transformer TR1 having a plurality of taps in its primary to permit the selection of any load voltage level between 105 and 134 volts in one volt steps by adjustment of a voltage setting rotary "coarse" switch SW2 and a voltage setting "fine" or vernier switch SW3.

SENSING STAGE AND BANDWIDTH CIRCUIT

The secondary winding S2 of potential sensing transformer TR1 is coupled to a full wave bridge rectifier comprising diodes D1-D4 of the calibration section CALIB of the voltage sensing stage of the control. The rectified voltage is coupled through a calibrating rheostat RH1 and a ripple-removing resistance capacitance filter R2, C1, R3 and derives a unidirectional "sample" voltage across a capacitor C2 at point TP1 proportional to the power line voltage at the output of the regulator.

A reference voltage $v_r$ is developed at a point TP3 across a Zener diode Z3 of the sensing stage reference section REF. Zener diode Z3 is connected in series with a resistance R5 between a regulated power supply +12V and ground, and reference voltage $v_r$ is applied across the series arrangement of a resistance R6, a bandwidth setting rheostat RH2, and a resistance R8 to ground. The sensing stage is initially calibrated by setting sample voltage $v_s$ at point TP1 equal to reference voltage $v_r$ at point TP3 by adjusting rheostat RH1 while a nominal potential of 120 is applied across the primary of sensing transformer TR1. The sensing section SENSE compares changes in sample voltage $v_s$ with the reference voltage $v_r$ and the amount of change in $v_s$ to be allowed before a tap change occurs is set by adjustment of rheostat RH2. The sensing stage derives an upper limit reference voltage and a lower limit reference voltage which are respectively more positive and more negative than the reference voltage $v_r$ by a preselected portion of reference voltage $v_r$. The preselected portion of $v_r$ is established by the setting of rheostat RH2. The lower limit reference voltage $v_x$ is derived at the wiper of rheostat RH2 and is more negative than reference voltage $v_r$. The upper limit reference voltage is derived at the output of a unity gain operational amplifier inverter 5A which in effect sums the reference voltage $v_r$ plus the difference between $v_r$ and $v_x$ (i.e., $v_r - v_x$) and inverts the polarity of the resultant voltage. Reference voltage $v_r$ is coupled to the noninverting input of inverter 5A and the lower limit reference voltage $v_x$ is applied to its inverting input so that the output of inverter 5A is more positive than $v_r$ by ($v_r - v_x$).

The bandwidth sensing section SENSE comprises operational amplifiers 4A and 4B connected as comparators. Amplifier 4A senses when the power line voltage rises above the upper bandwidth limit, and amplifier 4B detects when power line voltage drops below the lower bandwidth limit. The sample voltage $v_s$ at point TP1 proportional to the power line voltage is coupled to the inverting inputs of both amplifiers 4A and 4B. The lower limit reference voltage $v_x$ derived at the wiper of bandwidth adjusting rheostat RH2 is applied to the noninverting input of comparator 4B. The upper limit reference voltage derived at the output of inverter 5A is coupled to the noninverting input of comparator 4A.

Initial calibration is accomplished by applying 120 volts across the primary of sensing transformer TR1 and then adjusting calibrating rheostat RH1 until the sample potential $v_s$ at point TP1 is equal to the reference voltage $v_r$ at TP3. This is the only calibration required for the control.

Since the inverting input of 4A sees the sample voltage $v_s$ at TP1 and its noninverting input receives the upper limit reference output of inverter 5A (which is higher than the reference voltage $v_r$ by the calibrated portion of $v_r$ set on bandwidth adjusting potentiometer RH2), the output of comparator 4A is logic 1 at null (i.e., initially) and switches to logical zero when the line voltage exceeds the upper bandwidth limit. Similarly, since the inverting input of 4B sees the sample voltage $v_s$ at TP1 and its noninverting input receives the lower limit reference voltage $v_x$ from the slider of rheostat RH2, the output of 4B is logic 0 at null and switches to logic 1 if the line voltage drops below the lower bandwidth limit.

LOGIC

When the sensing stage detects that the power line voltage is beyond one of the bandwidth limits, the output of comparator 4A or 4B actuates the LOGIC circuit to: (a) start the TIMER, and (b) select which gate-triggered silicon AC switch TRIAC 1 or TRIAC 2 is to be triggered into conduction to energize the motor after the TIMER times out.

The output of comparator 4B is logic 0 at null and is coupled to one input of a NOR gate 2B. The output of comparator 4A is logic 1 at null and is coupled through a NOT gate, or inverter 2A to another input of NOR gate 2B. Consequently, both inputs of NOR gates 2B are logic 0 at null and its output is logic 1 which is coupled to the reset (R) input of a COUNTER of the TIMER, thereby disabling the timer. When the power line voltage exceeds one of the bandwidth limits, comparator 4A or 4B switches states to thereby change the output gate 2B to logic 0 to start the TIMER.

A pair of NAND gates 1A and 1B comprises a latch which controls which silicon AC switch, or bidirectional controlled rectifier TRIAC 1 or TRIAC 2 is to be triggered on. The output of NOT gate 2A, which is logic 0 at null, is coupled to one input of gate 1A, and the logic 0 output of gate 4B at null is coupled to one input of gate 1B. The logic 1 signal from the TIMER when it times out is coupled to one input of each of gates 1A and 1B. A third input to each gate 1A and 1B is from a 10 Khz oscillator OSC to provide firing pulses for the silicon AC switches as described hereinafter. The output of gate 1A is connected to one input of gate 1B, and the output of gate 1B is connected to an input of gate 1A to provide a latch configuration which assures that only one gate 1A or 1B at a time can be enabled and thereby preventing the firing of both silicon AC switches simultaneously.

When the load voltage exceeds one bandwidth limit, for example, the upper limit, the sensing stage output from gate 4B will go to logic 1 and consequently NOR gate 2B will go to logic 1 to start the TIMER. When the TIMER times out, its output goes to logic 1 so that all four inputs to gate 1B are logic 1 and it provides a logic 0 output to trigger silicon AC switch TRIAC 2 and thus energize the LOWER winding of the motor M to effect a tap change in a direction which will again bring the load voltage within the voltage bandwidth.

TIMER

The TIMER is of the digital type and uses the power line frequency as a time base. A pulse generator PG that derives 60 Hz timing pulses from the power line includes an amplifier comprising transistors T5 and T6 with positive feedback provided by a resistance R39. One side of a midtapped tertiary winding S3 of sensing transformer TR1 is coupled through two series resistances R41 and R40 to the base of NPN transistor T6 so that it is turned on and off by the half cycles of power line voltage. Turning on T6 lowers the voltage on the base of normally conducting transistor T5 and turns it off to generate a positive-going pulse at the collector of T5 which is fed back through resistance R39 to the base of NPN transistor T6. Resistance R40 and capacitor C10 constitute a filter which prevents noise from creating false timing pulses. Diode D12 protects transistor T6 from reverse bias.

The 60 Hz pulses from pulse generator PG are coupled through a NOR gate 2C to a digital pulse COUNTER which counts positive-going transitions from NOR gate 2C. Logic 0 from gate 2B is coupled to the reset input (R) to the counter to start the TIMER, and each negative-going transition of the collector of T5 enables gate 2C so that it provides a logic 1 timing pulse to the COUNTER. The COUNTER may be a known multi-stage binary counter wherein each stage is a master-slave flip-flop (not shown) and the counter is advanced one count on the negative-going transition of each input pulse, such as the commercially available CMOS 14-stage counter having the type designation SCL4020. The binary coded decimal output of the COUNTER is preferably changed to a stepped analog voltage proportioned to the stored count by an R-2R resistor ladder network RN1 shown in FIG. 2. The output from resistor ladder network RN1 is a stepped ramp rising with time wherein each step may be 43 millivolts high and occurs approximately every 2 seconds so that the instantaneous voltage of the RN1 network output is an analog of the stored count. The output of network RN1 is coupled to the noninverting output of a comparator operational amplifier 5B whose inverting input receives a reference voltage from a time delay adjusting rheostat RH3. Rheostat RH3 is connected in series with two resistances between the power supply +12V and ground and is adjusted to provide the desired time delay from TIMER and at null results in logic 0 output from comparator 5B. When the analog output voltage from ladder network RN1 is equal to the reference voltage from rheostat RH3, the output of comparator 5B switches to logic 1. The logic 1 output from comparator 5B is applied to one input to NOR gate 2C to disable it and thus block pulses from the 60 Hz pulse generator to the COUNTER and is also applied to one input of each gate 1A and 1B of the logic latch to enable the appropriate gate and thus allow the corresponding silicon AC switch TRIAC 1 or TRIAC 2 to be fired.

An oscillator OSC supplies a high frequency train of 10 Khz pulses to one input of each gate 1A and 1B to provide firing pulses for the corresponding silicon AC switches TRIAC 1 or TRIAC 2 when gate 1A or 1B is enabled. The high frequency oscillator OSC is known and comprises two integrated circuits 1C and 1D and preferably is of the type CD4012AF described on page 354 of RCA DATA BOOK SSD-203A. The 10 Khz pulses are inverted by NOT gate 2D and applied to one input of each gate 1A and 1B.

SILICON SWITCH FIRING CIRCUITS

The firing circuits TF for the silicon AC switches, or bidirectional controlled rectifiers TRIAC 1 and TRIAC 2 are identical and only the one for TRIAC 1 will be described. At null, both gates 1A and 1B have a logic 1 output. When the power line voltage drops below the lower bandwidth limit, sensing gate 4B provides a logic 1 output to NAND gate 1B and also to gate 2B to start the TIMER. When the TIMER times out and gate 5B thereof applies logic 1 to one input of each of gates 1A and 1B, all four inputs to gate 1B will be logic 1 when a 10 Khz pulse occurs, and gate 1B will switch to a logic 0 output for about 14 microseconds (the width of a 10 Khz pulse) at a 10 Khz pulse rate. The 14 microsecond logic 0 pulse from gate 1B is coupled through a resistance R20 to the base of a PNP transistor T4 and turns it on. A capacitor connected in shunt to resistance R20 speeds up the switching of T4. Flow of current through collector resistance R26 of T4 develops a voltage drop which forward biases and turns on an NPN transistor T3. Conduction by T3 applies the +12 volt source through the primary of a pulse transformer TR2 in series with the collector-emitter circuit of T3 to ground, thereby inducing a pulse in the secondary of TR2 which is applied to the gate of silicon AC switch TRIAC 1 and turns it on. Conduction by TRIAC 1 energizes the RAISE winding of motor M which rotates tap changer contacts 14 and 15 in a direction to raise the power line voltage applied to the load. The gating pulses from the secondary of pulse transformer TR2 are applied at a frequency of 10 Khz to assure that TRIAC 1 will remain in conduction and operate motor M.

A resistance R24 in series with a capacitor C4 is connected across silicon AC switch TRIAC 1 to prevent faulty firing as a result of noise that might be induced in the leads to the motor M. A saturating choke L1 may be connected in the output lead from the silicon AC switch TRIAC 1 to limit possible current surges during initial conduction and prevents failure resulting from $di/dt$ and $dv/dt$ effects. A metal oxide variable resistance transient suppression device RV1 such as the type commercially available from General Electric Company under the designation SC 241E may be connected between the common return lead to the silicon switches and ground to clip high voltage transients to a safe level.

POWER SUPPLY

The power supply for the control includes midtapped sensing transformer tertiary winding S3 whose ends are coupled to a full wave bridge rectifier comprising diodes D5-D8. The rectified pulses from opposite ends of bridge rectifier D5-D8 are coupled through surge resistors R7 and R29 respectively to filter capacitors C8 and C9 to provide a plus and minus supply. The voltages across filter capacitors C8 and C9 are applied through resistances R37 and R38 across Zener diodes Z1 and Z2 to provide regulated ±12 volt to the sensing, logic and timing stages.

While only a single embodiment of my invention has been illustrated and described, many modifications and variations thereof will be readily apparent to those skilled in the art, and consequently, it should be understood that I do not intend to be limited to the particular embodiment shown and described.

The embodiments of the invention in which an exclusive property or privilege is claimed are defined as follows:

1. In a step voltage regulator adapted to maintain its output voltage within upper and lower bandwidth limit, a bandwidth limit sensing circuit comprising
   means for providing a sample voltage which is a function of the regulator output voltage,
   a predetermined reference voltage source,
   means including a bandwidth setting potentiometer for deriving a lower limit reference potential which is a preselected fraction of said reference voltage,
   means coupled to said reference voltage source and to said potentiometer for deriving an upper limit reference potential whose magnitude is equal to the sum of said reference voltage plus the difference between said reference voltage and said lower limit reference potential, and
   first and second voltage comparator means for comparing said sample voltage respectively to said upper limit reference potential and to said lower limit reference potential.

2. In the combination of claim 1 wherein said means for deriving an upper limit reference potential includes a unity gain inverter operational amplifier having inputs coupled respectively to said reference voltage source and to the wiper of said bandwidth setting rheostat, the output of said inverter amplifier being an input to said first voltage comparator means.

3. In the combination of claim 2 wherein said reference voltage is applied across a voltage divider including the resistance element of said bandwidth setting rheostat and said lower limit reference potential is derived at the wiper of said bandwidth setting rheostat.

4. In the combination of claim 1 and including calibrating means for adjusting said sample voltage to be equal to that of said reference voltage source when the regulator output voltage is of desired magnitude potential.

5. In a step voltage regulator adapted to maintain its output voltage within upper and lower bandwidth limits, a bandwidth limit sensing circuit comprising
means for providing a sample voltage which is a function of the regulator output voltage,
a predetermined reference voltage source,
means including a bandwidth setting potentiometer having its resistance element in a circuit coupled across said reference voltage source for deriving a lower limit reference potential at the wiper of said potentiometer which is a preselected fraction of said reference voltage,
lower limit comparator means for comparing said sample voltage to said lower limit reference potential,
a unity gain inverter operational amplifier having inputs coupled respectively to said potentiometer wiper and to said reference voltage source, whereby the output of said inverter amplifier is greater than said reference voltage by the difference between said reference voltage and said lower limit reference potential, and
upper limit comparator means for comparing said sample voltage to the output voltage from said inverter operational amplifier.

6. In the combination of claim 5 and including calibrating means for adjusting said sample voltage to be equal to the reference voltage when the regulator output voltage is of desired magnitude.

7. In the combination of claim 6 wherein said lower limit comparator means includes an operational amplifier which receives said sample voltage and said lower limit reference potential respectively on its inverting and noninverting inputs.

8. In the combination of claim 7 wherein said upper limit comparator means includes an operational amplifier which receives said sample voltage on its inverting input and the output of said inverter amplifier on its noninverting input.

9. In a step voltage regulator adapted to maintain its output voltage within upper and lower bandwidth limits, a bandwidth limit sensing circuit comprising
means for providing a sample voltage which is a function of the regulator output voltage,
a predetermined reference voltage source,
a voltage divider including the resistance element of a bandwidth setting rheostat connected across said reference voltage source,
a lower limit voltage comparator operational amplifier which receives said sample voltage on its inverting input and has its noninverting input coupled to the wiper of said bandwidth setting rheostat,
an upper limit voltage comparator operational amplifier which receives said sample voltage on its inverting input, and
a unity gain operational amplifier having said reference voltage applied to its noninverting input and its inverting input coupled to said wiper of said bandwidth setting rheostat and its output coupled to the noninverting input of said upper limit sensing operational amplifier.

10. In the combination of claim 9 and including calibrating means for making said sample and reference voltages equal when the regulator output voltage is of the desired magnitude.

* * * * *

PO-1050
(5/69)

UNITED STATES PATENT OFFICE
CERTIFICATE OF CORRECTION

Patent No. 3,908,163        Dated September 23, 1975

Inventor(s) Thomas P. Gilmore

It is certified that error appears in the above-identified patent and that said Letters Patent are hereby corrected as shown below:

Column 8, line 32 --- inverter --- should be inserted after "amplifier".

Signed and Sealed this twenty-fourth Day of February 1976

[SEAL]

Attest:

RUTH C. MASON
Attesting Officer

C. MARSHALL DANN
Commissioner of Patents and Trademarks